(12) United States Patent
Matano et al.

(10) Patent No.: US 9,150,095 B2
(45) Date of Patent: Oct. 6, 2015

(54) VIBRATION SUPPRESSION STRUCTURE FOR FRONT-END MODULE

(71) Applicant: Nissan Motor Co., Ltd., Yokohama (JP)

(72) Inventors: Shinichi Matano, Atsugi (JP);
Masahiro Onishi, Kamakura (JP);
Miwako Takahashi, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/425,337

(22) PCT Filed: Aug. 16, 2013

(86) PCT No.: PCT/JP2013/072036
§ 371 (c)(1),
(2) Date: Mar. 3, 2015

(87) PCT Pub. No.: WO2014/041961
PCT Pub. Date: Mar. 20, 2014

(65) Prior Publication Data
US 2015/0224869 A1    Aug. 13, 2015

(30) Foreign Application Priority Data

Sep. 14, 2012  (JP) ................. 2012-202473

(51) Int. Cl.
*B60K 11/04* (2006.01)
*F16F 15/04* (2006.01)
(52) U.S. Cl.
CPC ............. *B60K 11/04* (2013.01); *F16F 15/04* (2013.01)

(58) Field of Classification Search
CPC ...... B60K 11/04; B62D 25/08; B62D 25/084; B62D 25/085; F16F 15/04
See application file for complete search history.

(56) References Cited

U.S. PATENT DOCUMENTS

| | | | | |
|---|---|---|---|---|
| 4,538,697 | A * | 9/1985 | Muroi et al. | 180/68.4 |
| 4,662,432 | A * | 5/1987 | Suzuki | 165/41 |
| 4,821,828 | A * | 4/1989 | Schwerzler et al. | 180/68.4 |
| 5,287,940 | A * | 2/1994 | Ogawa et al. | 180/68.4 |
| 5,785,140 | A * | 7/1998 | Suzuki et al. | 180/68.4 |
| 6,000,460 | A * | 12/1999 | Yamanaka et al. | 165/67 |
| 6,098,702 | A * | 8/2000 | Shadbourne et al. | 165/69 |
| 6,298,906 | B1 * | 10/2001 | Vize | 165/41 |
| 7,451,843 | B2 * | 11/2008 | Nakashima et al. | 180/68.1 |

(Continued)

FOREIGN PATENT DOCUMENTS

| | | |
|---|---|---|
| JP | 11-99964 A | 4/1999 |
| JP | 2003-237628 A | 8/2003 |

(Continued)

*Primary Examiner* — Brodie Follman
*Assistant Examiner* — Jacob Meyer
(74) *Attorney, Agent, or Firm* — Global IP Counselors, LLP

(57) ABSTRACT

A front-end module (FEM) having in-vehicle parts incorporated in a vehicle front section are aggregated and assembled to a heat exchanger support frame, the plurality of in-vehicle parts are classified into first in-vehicle parts, which vibrate at frequencies in a first frequency band, and a second in-vehicle part, which vibrates at a frequency in a second frequency band having a frequency range higher than the frequency range in the first frequency band. The first in-vehicle parts are elastically supported by the heat exchanger support frame via first mount members. The second in-vehicle part is rigidly fixed to the heat exchanger support frame. The heat exchanger support frame is elastically supported by a vehicle body via second mount members.

4 Claims, 6 Drawing Sheets

(56) References Cited

U.S. PATENT DOCUMENTS

| | | | |
|---|---|---|---|
| 7,882,913 B2 * | 2/2011 | Maeda et al. | 180/68.4 |
| 8,662,572 B2 * | 3/2014 | Abe et al. | 296/203.02 |
| 2007/0120301 A1 * | 5/2007 | Domen et al. | 267/152 |
| 2007/0246280 A1 * | 10/2007 | Maeda et al. | 180/68.4 |
| 2013/0161979 A1 * | 6/2013 | Abe et al. | 296/193.09 |

FOREIGN PATENT DOCUMENTS

| | | |
|---|---|---|
| JP | 2005-35436 A | 2/2005 |
| JP | 2005-186911 A | 7/2005 |
| JP | 2009-262876 A | 11/2009 |
| JP | 2012-66702 A | 4/2012 |

* cited by examiner

VIBRATION SUPPRESSION STRUCTURE FOR FRONT-END MODULE

CROSS-REFERENCE TO RELATED APPLICATIONS

This application is a U.S. National stage application of International Application No. PCT/JP2013/072036, filed Aug. 16, 2013 which claims priority to Japanese Patent Application No. 2012-202473 filed in Japan on Sep. 14, 2012, the contents of each of which are hereby incorporated herein by reference.

BACKGROUND

1. Field of the Invention

The present invention relates to a vibration suppression structure for a front-end module in which a plurality of in-vehicle parts incorporated in a vehicle front section are aggregated and assembled to a heat exchanger support frame.

2. Background Information

There is a known cooling part support apparatus for a vehicle of related art in which a radiator core support that is a substantially rectangular frame member is disposed in a front section of a vehicle body and a radiator is supported in a space surrounded by the radiator core support (see Japanese Laid-Open Patent Application No. 2009-262876, for example).

SUMMARY

On the other hand, to not only reduce the number of parts, weight, and cost but also achieve ease of assembly and disassembly, there is a known front-end module in which a plurality of in-vehicle parts incorporated in a vehicle front section (radiator as well as condenser, motorized fan, water pump, and other parts) are aggregated and assembled to a radiator core support.

However, even when the plurality of in-vehicle parts are fixed to the radiator core support and the radiator core support is elastically supported by a vehicle body, there are still in-vehicle parts that cannot be sufficiently suppressed in terms of vibration because the plurality of in-vehicle parts have different vibration frequency bands within which they vibrate, undesirably resulting in pulsation sound and vibration propagated from these in-vehicle parts into a vehicle compartment.

For example, tuning a mount member via which the radiator core support is elastically supported by the vehicle body in such a way that vibration in high frequency bands is damped compromises vibration suppression characteristics of in-vehicle parts that vibrate in low frequency bands. Conversely, tuning the mount member, via which the radiator core support is elastically supported by the vehicle body, in such a way that vibration in the low frequency bands is damped lowers supporting rigidity of the radiator core support, possibly resulting in newly produced vibration due to external excitation, for example, from a road surface.

The present invention has been made in view of the problems described above, it being an object of the present invention to provide a vibration suppression structure for a front-end module that suppresses pulsation sound/vibration propagated from a plurality of in-vehicle parts incorporated in a vehicle front section via a vehicle body into a vehicle compartment with no decrease in rigidity with which the in-vehicle parts are supported by the vehicle body.

To achieve the object described above, the present invention relates to a front-end module in which a plurality of in-vehicle parts incorporated in a vehicle front section are aggregated and assembled to a heat exchanger support frame.

In the front-end module, the plurality of in-vehicle parts are classified into a first in-vehicle part that vibrates at a frequency in a first frequency band and a second in-vehicle part that vibrates at a frequency in a second frequency band having a frequency range higher than the frequency range in the first frequency band.

The first in-vehicle part is elastically supported by the heat exchanger support frame interposed by a first mount member, The second in-vehicle part is rigidly fixed to the heat exchanger support frame.

The heat exchanger support frame is elastically supported by a vehicle body interposed by a second mount member.

As described above, the first in-vehicle part that vibrates at a frequency in the first frequency band (low frequency band) is elastically supported by the vehicle body via the first mount member and the second mount member that forms a double vibration suppression structure. On the other hand, the second in-vehicle part that vibrates at a frequency in the second frequency band (high frequency band) is elastically supported by the vehicle body via the second mount member that forms a vibration suppression structure.

Therefore, when the first in-vehicle part vibrates as a part at a frequency in the first frequency band (low frequency band), the vibration from the first in-vehicle part is damped by the first mount member and further damped by the second mount member before transmitted to the vehicle body, whereby pulsation sound and vibration propagated from the vehicle body into the vehicle compartment can be suppressed to a small amount.

On the other hand, when the second in-vehicle part vibrates as a part at a frequency in the second frequency band (high frequency band), the vibration from the second in-vehicle part is damped by the second mount member along with the heat exchanger support frame before being transmitted to the vehicle body, whereby pulsation sound and vibration propagated from the vehicle body into the vehicle compartment can be suppressed to a small amount. In this configuration, the second mount member, via which the heat exchanger support frame is supported by the vehicle body, does not need to damp vibration at a frequency in the first frequency band (low frequency band) and can therefore be formed of a hard member having a high spring constant, whereby the rigidity with which the heat exchanger support frame is supported by the vehicle body is not lowered.

As described above, the vibration suppression structure that damps vibration of a part at a frequency in the first frequency band (low frequency band) and the vibration suppression structure that damps vibration of a part at a frequency in the second frequency band (high frequency band) are configured to differ from each other. As a result, pulsation sound/vibration propagated from the plurality of in-vehicle parts incorporated in the vehicle front section via the vehicle body into the vehicle compartment can be suppressed without a decrease in the rigidity with which the in-vehicle parts are supported by the vehicle body.

BRIEF DESCRIPTION OF THE DRAWINGS

Referring now to the attached drawings which form a part of this original disclosure.

DETAILED DESCRIPTION OF EMBODIMENTS

Figure 1:
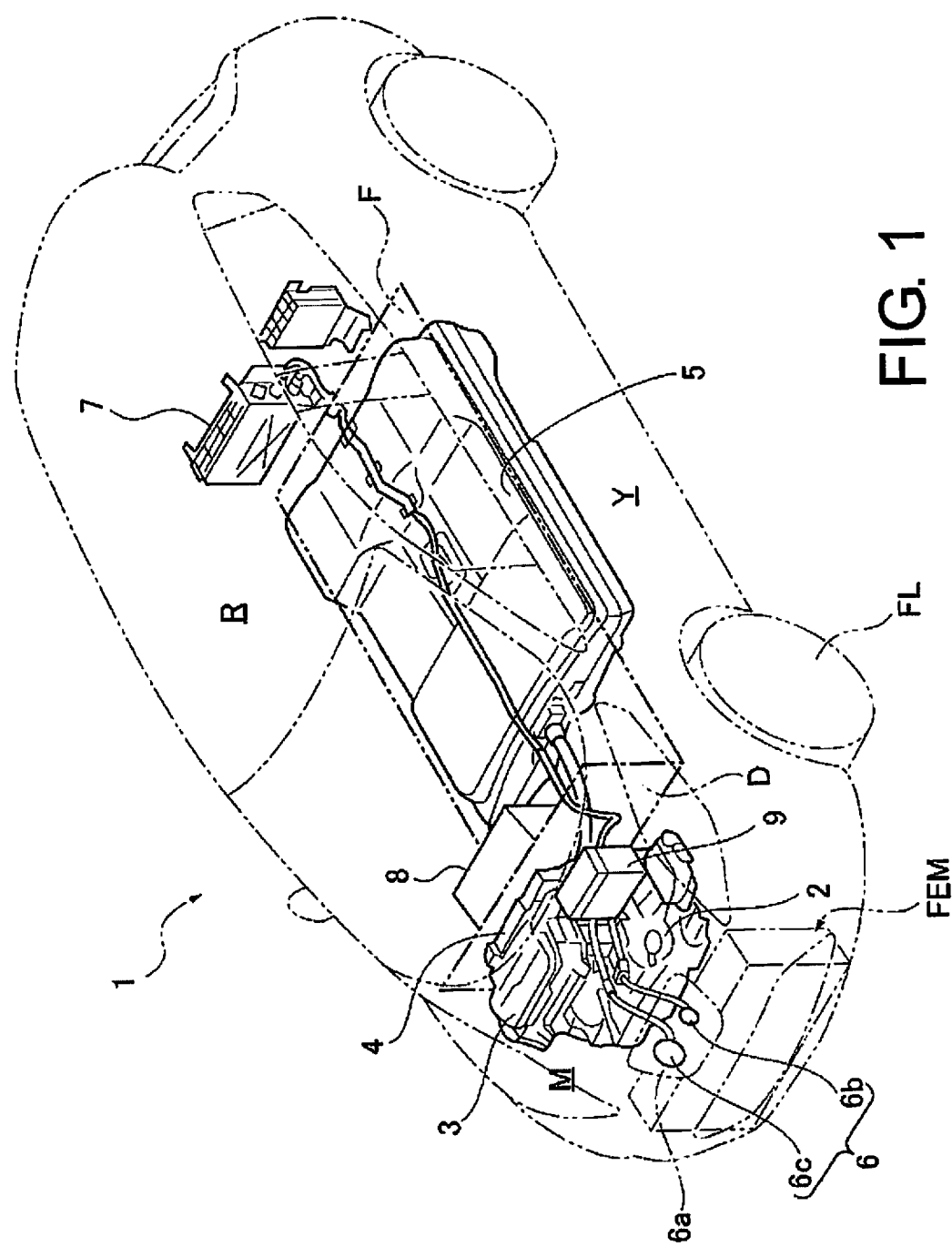
FIG. 1 is a perspective view showing a schematic configuration of a sedan-type electric automobile in which a front-end module FEM according to Embodiment 1 is incorporated.

The best mode for achieving a vibration suppression structure for a front-end module according to the present invention is described below based on Embodiment 1 shown in the drawings.

Embodiment 1

First, the configuration will be described.

The configuration of the vibration suppression structure of the front-end module in Embodiment 1 is divided into "General configuration of the front-end module incorporated in a vehicle," "Overall system configuration including in-vehicle parts in the front-end module," and "Detailed configuration of the vibration suppression structure of the front-end module," and each of the configurations will be described below.

General Configuration of Front-End Module Incorporated in Vehicle

FIG. 1 shows a schematic configuration of a sedan-type electric automobile in which a front-end module FEM according to Embodiment 1 is incorporated. A general configuration of the front-end module FEM incorporated in the vehicle is described below with reference to FIG. 1.

An electric automobile 1 in which the front-end module FEM according to Embodiment 1 is incorporated includes a driving motor 2, a driving motor inverter 3, a DC/DC junction box 4, a battery pack 5, a charging port 6, an in-vehicle charger 7, an air conditioner unit 8, and a 12-volt in-vehicle battery 9, as shown in FIG. 1.

The driving motor 2 described above is a drive source for running purposes having reduction gears and is disposed in a motor compartment M provided in a vehicle front section. The output shaft (not shown) of the driving motor 2 is connected to right and left front wheels that are drive wheels (only left front wheel FL is shown). When a positive torque instruction is outputted to the driving motor inverter 3, the driving motor 2 performs drive operation in which electric power discharged from the battery pack 5 is used to produce driving torque to drive the right and left front wheels (power running). On the other hand, when a negative torque instruction is outputted to the driving motor inverter 3, the driving motor 2 performs power generation operation in which the rotational energy from the right and left front wheels is converted into electric energy and supplies the battery pack 5 with the generated electric power as charging electric power (regeneration).

The DC/DC junction box 4 described above has a built-in DC/DC converter and distributes high-voltage electric power discharged from the battery pack 5 to supply a 12-volt power source system with the electric power and charge the 12-volt in-vehicle battery 9. Further, the DC/DC junction box 4 has a normal charging relay and a rapid charging relay and is configured to switch a charging circuit to another in accordance with a charging mode.

The battery pack 5 described above is disposed in an under-floor space Y, which is located below a floor panel F, and in a position of a central portion of the wheel base. The battery pack 5 serves as a power source for the driving motor 2 and a power source for the air conditioner unit 8.

The charging port 6 described above is a portion to which a charging connector from an off-vehicle power source, such as a charging stand and a household charging facility, is connected, provided in central positions in the vehicle front section, and covered with an openable/closable port lid 6a. The charging port 6 is formed of a normal charging port 6b and a rapid charging port 6c in Embodiment 1. The normal charging port 6b is a charging port used at the time of charging using a household charging facility, a standard charging stand, or any other facility and is connected to the DC/DC junction box 4 via the in-vehicle charger 7. The rapid charging port 6c is a charging port used at the time of charging using a rapid charging stand or any other facility and is directly connected to the DC/DC junction box 4.

The air conditioner unit 8 described above is disposed above the floor panel F, that is, in a vehicle compartment R and on the side closer to the vehicle front section than the battery pack 5. In Embodiment 1, the air conditioner unit 8 is disposed between a dash panel D, which separates the motor compartment M and the vehicle compartment R from each other, and an instrument panel (not shown). The air conditioner unit 8 delivers temperature-adjusted air having undergone temperature adjustment so that a set temperature is achieved toward the vehicle compartment R.

The front-end module FEM described above is disposed in the vehicle below the charging port 6 and in a position immediately behind a running air inlet in the vehicle front section. The configuration of the front-end module FEM will be described later in detail.

Overall System Configuration Including in-Vehicle Parts in the Front-End Module

Figure 2:
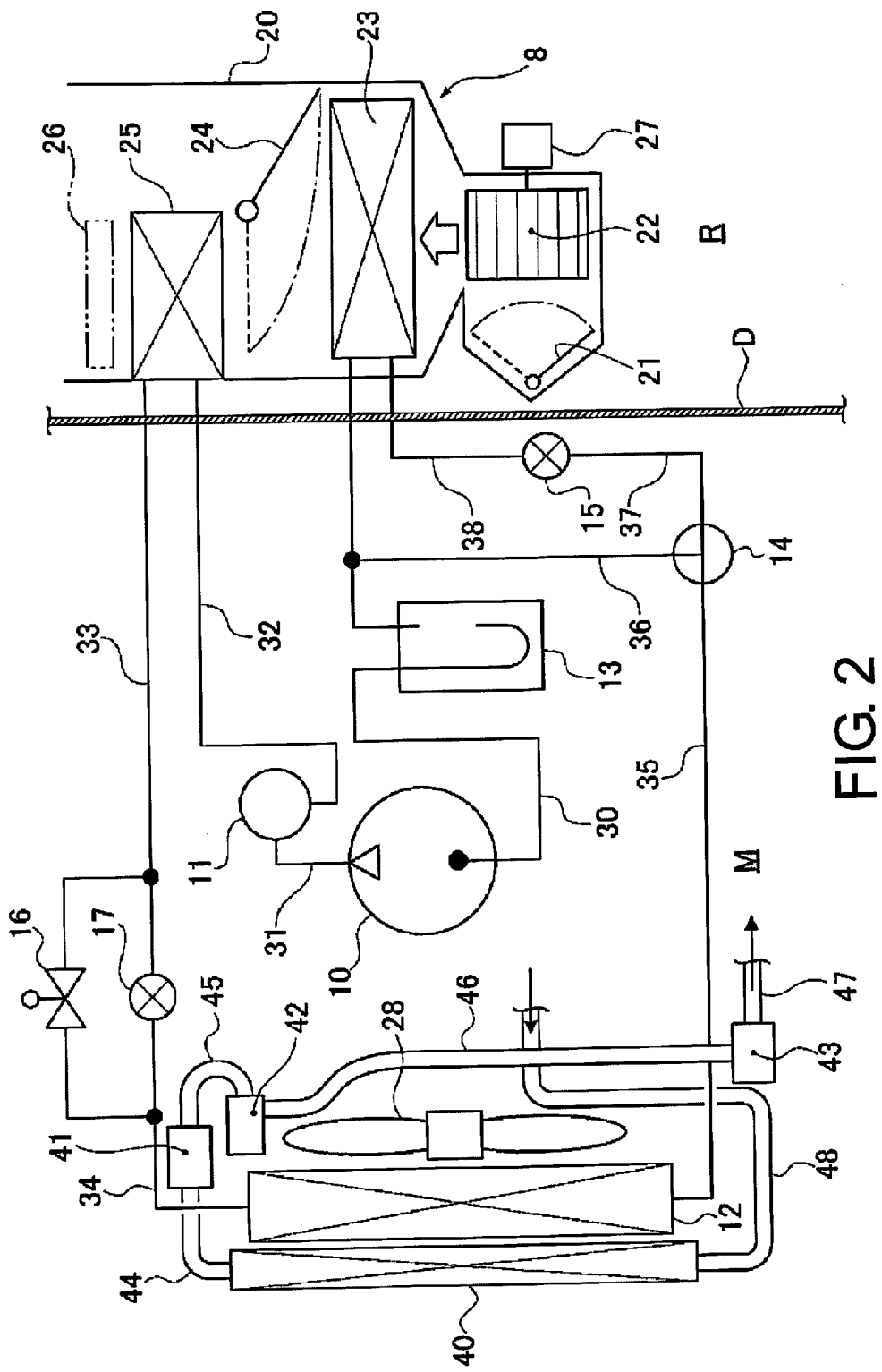
FIG. 2 is an overall system configuration diagram showing a heat-pump-type air conditioning system and a high-voltage part cooling system including in-vehicle parts in the front-end module FEM according to Embodiment 1.

FIG. 2 is an overall system configuration diagram showing a heat-pump-type air conditioning system and a high-voltage part cooling system including in-vehicle parts in the front-end module FEM according to Embodiment 1. The overall system configuration including the in-vehicle parts in the front-end module FEM will be described below with reference to FIG. 2.

The heat-pump-type air conditioning system is divided into the vehicle compartment R and the motor compartment M, which sandwich the dash panel D, and the air conditioner unit 8 is disposed in the vehicle compartment R, as shown in FIG. 2. On the other hand, in the motor compartment M are disposed a motorized compressor 10, a muffler 11, an out-compartment heat exchanger 12, an accumulator 13, a three-way valve 14, a cooling restrictor 15, an electromagnetic valve 16, and a heating restrictor 17.

The air conditioner unit 8 described above includes an inside air/outside air switching door 21, a blower fan 22, an evaporator 23, a mode switching door 24, a condenser 25, and a PTC heater 26 in a unit case 20.

The blower fan 22 is driven and rotated by a fan motor 27, introduces inside air or outside air selected by the inside air/outside air switching door 21, and delivers the introduced air toward the downstream side, where the evaporator 23 and other components are provided.

The evaporator 23 described above is disposed in a position downstream of the blower fan 22 and has a function of evaporating a low-temperature, low-pressure liquid refrigerant so that it absorbs heat when a "cooling mode" is selected.

The mode switching door 24 described above is disposed in a position downstream of the evaporator 23 and is opened when a "heating mode" is selected so that the delivered air passes through the condenser 25, and closed when the "cooling mode" is selected so that the delivered air does not pass through the condenser 25.

The condenser 25 described above is disposed in a position downstream of the evaporator 23 and the mode switching door 24 and has a function of condensing a high-temperature, high-pressure gas coolant so that it dissipates heat when the "heating mode" is selected.

The PTC heater 26 described above is disposed in a position downstream of the condenser 25 and is an auxiliary heat source added, for example, only when the automobile has a cold weather specification. That is, in the case of the heat-pump-type air conditioning system, since the condenser 25 is disposed in the unit case 20 and serves as a heat source for heating purposes, the PTC heater 26 is not particularly required except in the cold weather specification.

The motorized compressor 10 described above is a compressor driven by a motor, compresses a low-temperature, low-pressure gas refrigerant delivered from the accumulator 13 through a refrigerant intake tube 30 to convert it into a high-temperature, high-pressure gas refrigerant, and delivers it to a compressor-side refrigerant discharge tube 31.

The muffler 11 described above is pulsation suppression means for suppressing pulsation of the refrigerant discharged from the motorized compressor 10, suppresses pulsation that is pressure variation associated with the high-temperature, high-pressure gas refrigerant delivered from the motorized compressor 10 through the compressor-side refrigerant discharge tube 31, and delivers the refrigerant to a condenser-side refrigerant discharge tube 32.

The out-compartment heat exchanger 12 described above is positioned in the vehicle front section and includes a cooling fan unit 28 in a position shifted from a heat exchanging surface of the out-compartment heat exchanger 12 toward the vehicle rear side. The out-compartment heat exchanger 12 receives the refrigerant from the condenser 25 through coolant tubes 33 and 34 and delivers the refrigerant to the accumulator 13 through refrigerant tubes 35 and 36 or delivers the refrigerant to the evaporator 23 through coolant tubes 35, 37, and 38. That is, the out-compartment heat exchanger 12 is a heat exchanger that serves as both an evaporator and a condenser depending on its operating condition, for example, serves as an evaporator (absorbs heat) in the heating mode whereas serving as a condenser (dissipating heat) in the cooling mode.

The accumulator 13 described above separates a gas-liquid mixture refrigerant delivered from the out-compartment heat exchanger 12 or the evaporator 23 into a gas refrigerant and a liquid refrigerant and delivers the separated gas refrigerant to the motorized compressor 10 through the refrigerant intake tube 30.

The three-way valve 14 switches the refrigerant path between a refrigerant path that allows the refrigerant tube 35 to communicate with the refrigerant tube 36 and a refrigerant path that allows the refrigerant tube 35 to communicate with and the refrigerant tube 37.

The cooling restrictor 15 described above expands the refrigerant delivered from the out-compartment heat exchanger 12 through the refrigerant tubes 35 and 37 when the "cooling mode" is selected so that the refrigerant is converted into a low-temperature, low-pressure liquid coolant and delivers it to the evaporator 23 through the refrigerant tube 38.

The electromagnetic valve 16 described above is a valve that is disposed between the refrigerant tubes 33 and 34 in parallel to the heating restrictor 17 and switches the refrigerant path between a refrigerant path (valve closed) that allows the refrigerant to pass through the heating restrictor 17 and a refrigerant path (valve open) that disables the restrictor effect.

The heating restrictor 17 described above expands the refrigerant delivered from the condenser 25 through the refrigerant tube 33 when the "heating mode" is selected so that the refrigerant is converted into a low-temperature, low-pressure liquid refrigerant and delivers it to the out-compartment heat exchanger 12 through the refrigerant tube 34.

The high-voltage part cooling system described above includes a radiator 40, an air removal tank 41, a first motorized water pump 42, and a second motorized water pump 43, as shown in FIG. 2.

The radiator 40 described above is a heat exchanger that cools a coolant that cools high-voltage parts (driving motor 2, driving motor inverter 3, DC/DC junction box 4, and in-vehicle charger 7) based on coolant/outside air heat exchange. A coolant outlet tube 44 and a coolant inlet tube 48 are connected to the radiator 40.

The air removal tank 41 is a tank that removes air bubbles contained in the coolant sucked from the radiator 40 through the coolant outlet tube 44 into the first motorized water pump 42.

The first motorized water pump 42 is disposed in a position downstream of the air removal tank 41 and pumps the coolant sucked from the air removal tank 41 through a coolant tube 45 to a coolant tube 46.

The second motorized water pump 43 described above is disposed in a position inside a front fender and pumps the coolant sucked from the first motorized water pump 42 through the coolant tube 46 to a coolant tube 47. That is, when one of the two motorized water pumps 42 and 43 fails, the other pump can be driven at a higher speed to compensate for the loss in the amount of flow.

Figure 3:
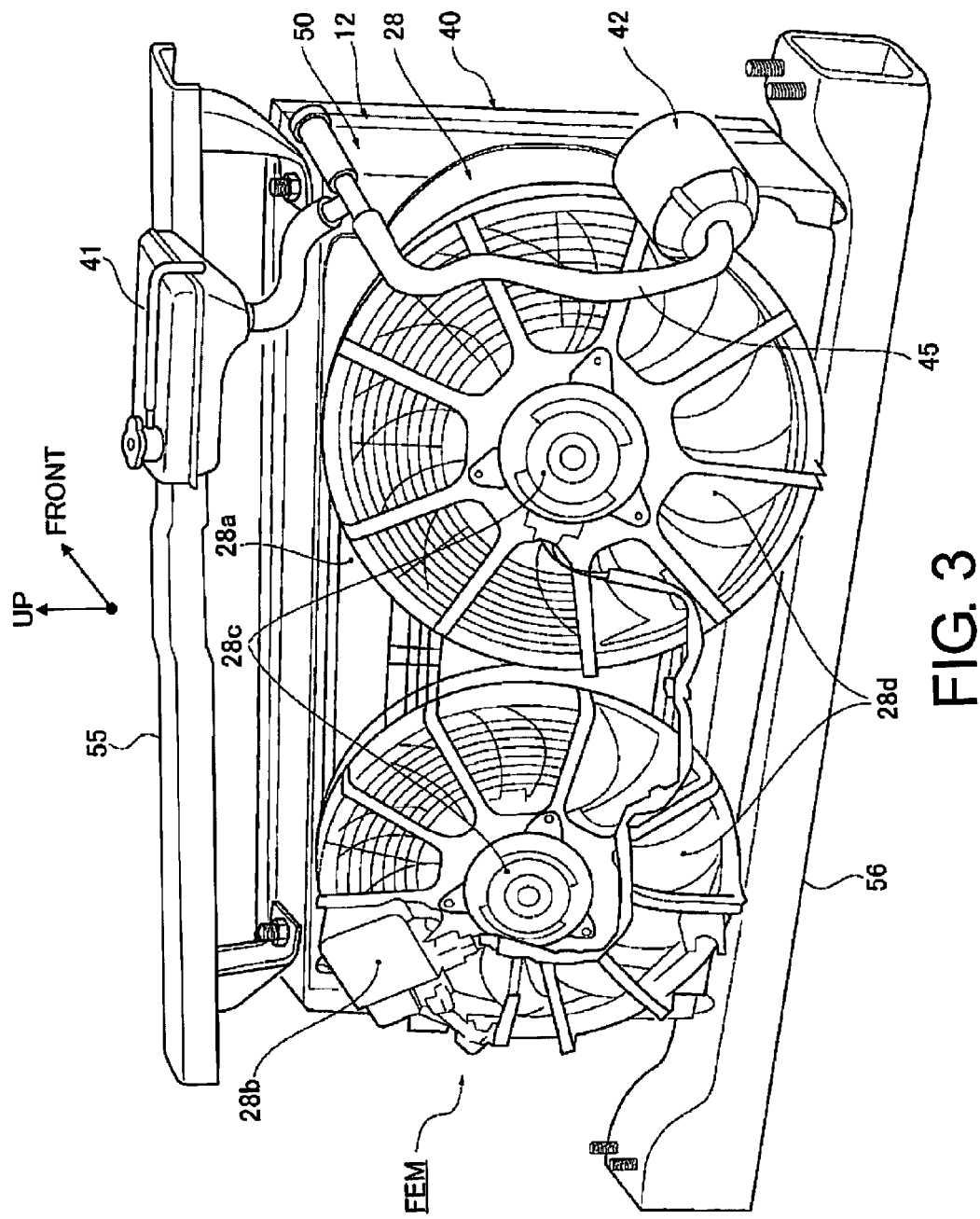
FIG. 3 is a perspective view viewed from a motor compartment side and showing a detailed configuration of a vibration suppression structure of the front-end module FEM according to Embodiment 1.
Figure 4:
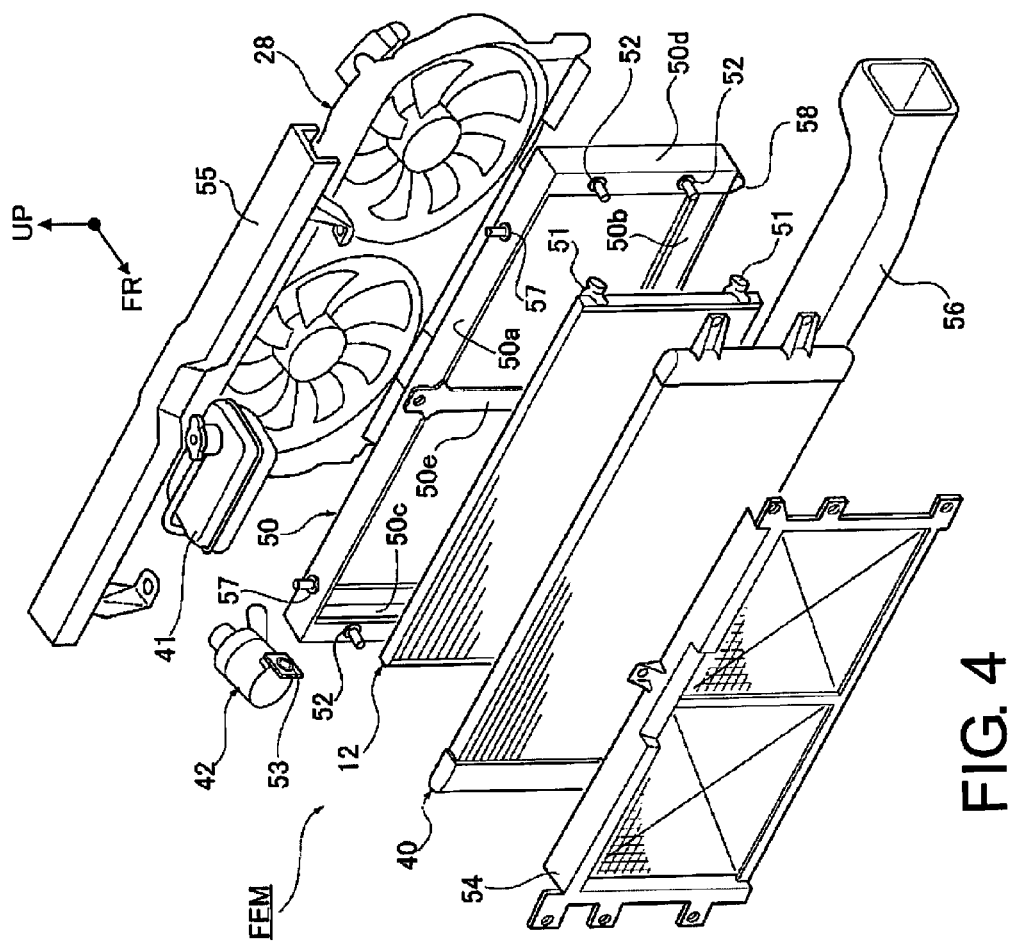
FIG. 4 is an exploded perspective showing a detailed configuration of the vibration suppression structure of the front-end module FEM according to Embodiment 1.

Detailed Configuration of Vibration Suppression Structure of the Front-End Module FIGS. 3 and 4 show a detailed configuration of the vibration suppression structure of the front-end module FEM according to Embodiment 1. The detailed configuration of the vibration suppression structure of the front-end module FEM is described below with reference to FIGS. 3 and 4.

The front-end module FEM described above includes a heat exchanger support frame 50, the out-compartment heat exchanger 12 (first in-vehicle part), the radiator 40 (first in-vehicle part), the first motorized water pump 42 (first in-vehicle part), and the cooling fan unit 28 (second in-vehicle part), as shown in FIGS. 3 and 4.

The front-end module FEM is a module in which a plurality of in-vehicle parts incorporated in the vehicle front section (out-compartment heat exchanger 12, radiator 40, first motorized water pump 42, and cooling fan unit 28) are aggregated and assembled to the heat exchanger support frame 50. The pre-assembled front-end module FEM is supplied to an assembly line where the electric automobile 1 is assembled, and the front-end module FEM in the form of the module is assembled to a vehicle body framework.

The heat exchanger support frame 50 has a rectangular-frame-like shape formed of a support upper section 50a, a support lower section 50b, and support side sections 50c and 50d, and a center plate 50e extending in the vehicle upward/downward direction is placed in a central portion of the space surrounded by the rectangular frame.

In the space surrounded by the heat exchanger support frame, the out-compartment heat exchanger 12 is disposed in a position close to the cooling fan unit 28 (in-vehicle inner position), and the radiator 40 is disposed in a position remote from the cooling fan unit 28 (in-vehicle outer position). That is, the out-compartment heat exchanger 12 and the radiator 40 are so disposed that the heat exchanging surfaces thereof are disposed side by side in the vehicle frontward/rearward direction.

The heat exchanger support frame 50 is designed to have a multi-use frame structure that allows the positions of the radiator 40 and the out-compartment heat exchanger 12 in the vehicle frontward/rearward direction to be changed to each other so that the radiator 40 is disposed in a position close to the cooling fan unit 28 and the out-compartment heat exchanger 12 is disposed in a position remote from the cooling fan unit 28.

The plurality of in-vehicle parts described above are classified into first in-vehicle parts (out-compartment heat exchanger 12, radiator 40, and first motorized water pump 42) that vibrate at a frequency in a first frequency band (low frequency band) and second in-vehicle parts (cooling fan unit 28) that vibrate at a frequency in a second frequency band (high frequency band) having a frequency range higher than that in the first frequency band.

The first frequency band and the second frequency band are set, for example, as follows: Among measured vibration frequency of the plurality of in-vehicle parts, vibration frequencies of in-vehicle parts that are separate from each other by the greatest amount are extracted; a boundary frequency is set in the frequency band between the vibration frequencies; and the frequency band lower than the boundary frequency band is called the first frequency band; and the frequency band higher than the boundary frequency band is called the second frequency band.

The out-compartment heat exchanger 12, the radiator 40, and the first motorized water pump 42 classified as the first in-vehicle parts described above are elastically supported by the heat exchanger support frame 50 interposed by a first mount member (low-frequency mount member) that damps vibration of a part at a frequency in the first frequency band (low frequency band).

The frame-based support of the out-compartment heat exchanger 12 described above is elastic support in which elastic protrusions 51 (first mount member), which protrude toward the motor compartment M, are provided in upper and lower positions of side tanks of the out-compartment heat exchanger 12 and the elastic protrusions are pressed against the support side sections 50c and 50d of the heat exchanger support frame 50 at the four locations. The out-compartment heat exchanger 12 is positioned when it comes into contact with the radiator 40, which is fixed to the heat exchanger support frame 50 but located outside the out-compartment heat exchanger 12.

The frame-based support of the radiator 40 described above is performed as follows: Brackets each having a bolt hole and protruding in the vehicle width direction are provided in upper and lower positions of side tanks of the radiator 40; stud bolts on the support side sections 50c and 50d of the heat exchanger support frame 50 are inserted into the bolt holes; and the stud bolts are fastened with nuts and fixed to the brackets. In this process, elastic rings 52 (first mount member) are interposed between the brackets with the bolt holes and the support side sections 50c, 50d so that the radiator 40 is elastically supported by the heat exchanger support frame 50.

The frame-based support of the first motorized water pump 42 described above is performed as follows: A bracket with a bolt hole is provided; a stud bolt on the support side section 50c of the heat exchanger support frame 50 is inserted into the bolt hole; and the stud bolt is fastened with a nut and fixed to the bracket. In this process, an elastic ring 53 (first mount member) is interposed between the bracket with the bolt hole and the support side section 50c so that the first motorized water pump 42 is elastically supported by the heat exchanger support frame 50.

The cooling fan unit 28 classified as the second in-vehicle part described above is rigidly fixed to the heat exchanger support frame 50.

The cooling fan unit 28 has a motorized dual cooling fan structure and includes a resin shroud 28a, a fan control module 28b, two fan motors 28c, and two cooling fans 28d, as shown in FIG. 3.

The frame-based fixation of the cooling fan unit 28 described above is performed as follows: The resin shroud 28a is fixed to the support upper section 50a and the support lower portion 50b of the heat exchanger support frame 50 with bolts.

A chipping guard 54 is disposed in a position outside the radiator 40 (vehicle foremost position) so as to cover the radiator 40 and the out-compartment heat exchanger 12, as shown in FIG. 4, and the chipping guard 54 is also fixed to the heat exchanger support frame 50. That is, the chipping guard 54 is also part of the front-end module FEM.

When the front-end module FEM described above is assembled to the vehicle body, the heat exchanger support frame 50 is elastically supported by an upper front cross member 55 (vehicle body) and a lower front cross member 56 (vehicle body) interposed by a second mount member (high-frequency mount member) that damps vibration of a part at a frequency in the second frequency band (high frequency band), as shown in FIGS. 3 and 4.

The upper support of the heat exchanger support frame 50 described above is performed as follows: Member brackets each having a bolt hole are provided on the upper front cross member 55; stud bolts on the support upper section 50a of the heat exchanger support frame 50 are inserted into the bolt holes; and the stud bolts are fastened with nuts and fixed to the member brackets. In this process, elastic rings 57 (second mount member) are interposed between the member brackets with the bolt holes and the support upper section 50a so that the heat exchanger support frame 50 is elastically supported by the upper front cross member 55. The lower support of the heat exchanger support frame 50 is performed as follows: Elastic protrusions 58 (second mount member), which protrude downward, are provided on the lower surface of the support lower portion 50b; and the elastic protrusions 58 are pressed against a support surface of the lower front cross member 56 so that the heat exchanger support frame 50 is elastically supported by the lower front cross member 56.

An advantageous effect is next described.

An advantageous effect provided by the vibration suppression structure of the front-end module FEM according to Embodiment 1 is divided into "a heat-pump-type air conditioning effect," "a high-voltage part cooling effect," and "a front-end module vibration suppression effect," and each of the effects will be described.

Heat-Pump-Type Air Conditioning Effect

The heat-pump-type air conditioning system operates broadly in the "heating mode" and the "cooling mode" as an air conditioning mode. The heat-pump-type air conditioning effect in each of the modes is described below with reference to FIGS. 5 and 6.

The reason why the heat-pump-type air conditioning system is incorporated as an air conditioner in the electric automobile is first be described.

A typical vehicle air conditioner is a cooling-dedicated air conditioning system in which only an evaporator is disposed in a vehicle compartment and a condenser is disposed outside the vehicle compartment. However, when such a cooling-dedicated air conditioning system is incorporated in an electric automobile, heat exhausted from an engine cannot be used as a heat source for heating purposes, and a PTC heater or any other heat source for heating purposes therefore needs to be provided, resulting in an increase in consumption of battery energy in the "heating mode" and a decrease in actual running distance accordingly.

That is, as an air conditioner in an electric automobile, incorporating a heat-pump-type air conditioning system that can use a refrigerant to provide a heat source for heating purposes can improve an actual running distance when heating is required.

Figure 5:
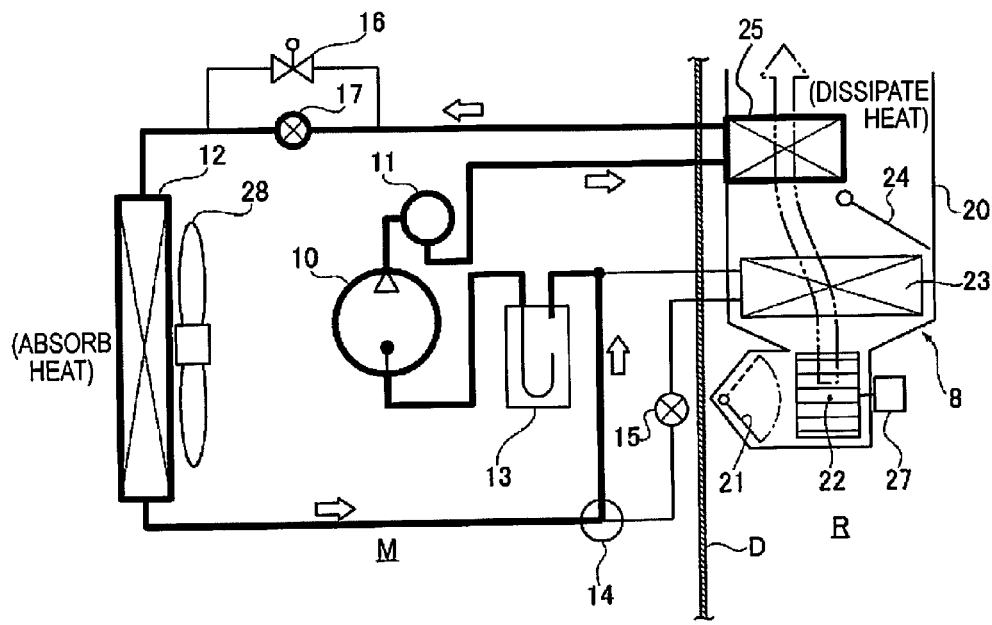
FIG. 5 is a heating mode effect descriptive diagram showing how a heat-pump-type air conditioning system operates when a heating mode is selected.

Heating Mode (FIG. 5)

When the "heating mode" is selected, the three-way valve 14 selects the path that bypasses the cooling restrictor 15, and the electromagnetic valve 16 is closed so that the path that uses the heating restrictor 17 is selected. Further, the mode switching door 24 is opened so that the delivered air passes through the condenser 25.

In the "heating mode," the motorized compressor 10 compresses the gas refrigerant delivered from the accumulator 13 to convert it into a high-temperature, high-pressure gas refrigerant. The high-temperature, high-pressure gas refrigerant produced by the motorized compressor 10 passes through the muffler 11 and enters the condenser 25, which condenses the high-temperature, high-pressure gas refrigerant and dissipates the heat, as indicated by the arrows shown in FIG. 5. The heat dissipated from the condenser 25 is delivered in the form of heated air into the vehicle compartment R to heat the air in the vehicle compartment R so that the temperature in the vehicle compartment is increased for heating.

The condensed refrigerant then passes through the heating restrictor 17 and is converted into a low-temperature, low-pressure liquid refrigerant, and the out-compartment heat exchanger 12 evaporates the low-temperature, low-pressure liquid refrigerant to absorb heat. The out-compartment heat exchanger 12 is called a "heat pump" because it functions as an evaporator and draws heat in the air.

The out-compartment heat exchanger 12 is disposed on the side close to the cooling fan unit 28 because in the "heating mode," in which the out-compartment heat exchanger 12 absorbs heat, the heat absorption efficiency in the case where the radiator 40 is disposed in a position outside the out-compartment heat exchanger 12 is higher than the heat absorption efficiency in a case where the out-compartment heat exchanger 12 is disposed in a position outside the radiator 40. It is noted that in a cooling-dedicated air conditioning system, the radiator is disposed on the side close to the cooling fan unit and the condenser is disposed on the side remote from the cooling fan unit.

Figure 6:
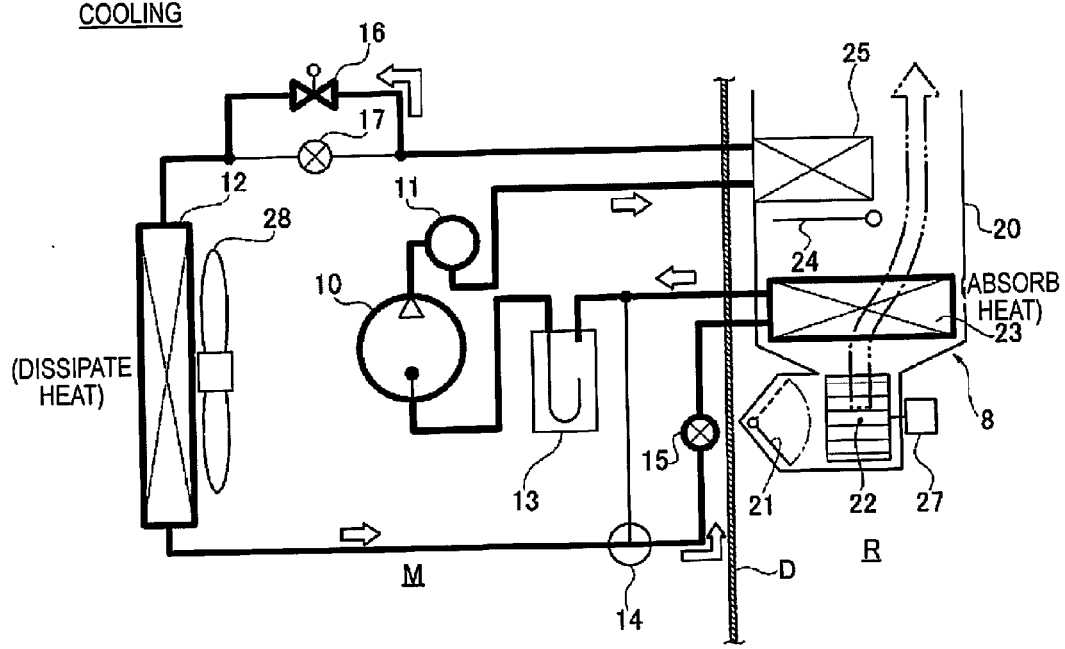
FIG. 6 is a cooling mode effect descriptive diagram showing how the heat-pump-type air conditioning system operates when a cooling mode is selected.

Cooling Mode (FIG. 6)

When the "cooling mode" is selected, the three-way valve 14 selects the path that causes the refrigerant to pass through the cooling restrictor 15, and the electromagnetic valve 16 is opened so that the path that does not use the heating restrictor 17 is selected. Further, the mode switching door 24 is closed so that the delivered air does not pass through the condenser 25.

In the "cooling mode," the motorized compressor 10 compresses the gas refrigerant delivered from the accumulator 13 to convert it into a high-temperature, high-pressure gas refrigerant. The high-temperature, high-pressure gas refrigerant produced by the motorized compressor 10 passes through the muffler 11 and enters the condenser 25, but no heat exchange occurs because the mode switching door 24 is closed. The high-temperature, high-pressure gas refrigerant therefore directly passes through the open electromagnetic valve 16 and enters the out-compartment heat exchanger 12, as indicated by the arrows in FIG. 6. The out-compartment heat exchanger 12 condenses the high-temperature, high-pressure gas refrigerant to dissipate the heat (condenser function), so that the high-temperature, high-pressure gas refrigerant is converted into a room-temperature, high-pressure gas-liquid mixture refrigerant. The following cooling restrictor 15 expands the room-temperature, high-pressure gas-liquid mixture refrigerant to convert it into a low-temperature, low-pressure liquid refrigerant. The evaporator 23 disposed in the vehicle compartment R then evaporates the low-temperature, low-pressure liquid refrigerant to absorb the heat, so that heat is taken from the air in the vehicle compartment R, whereby the temperature in the vehicle compartment is lowered for cooling.

In the "heating mode" or the "cooling mode," the out-compartment heat exchanger 12 vibrates at a vibration frequency in the low frequency band due to variation in the pressure of the refrigerant that passes through the path inside the out-compartment heat exchanger 12.

High-Voltage Part Cooling Effect

An electric automobile, in which high-voltage parts that become hot are incorporated, has a built-in high-voltage part cooling system based on a pump forced circulation method for cooling the high-voltage parts. The high-voltage part cooling effect is described below with reference to FIG. 7.

Figure 7:
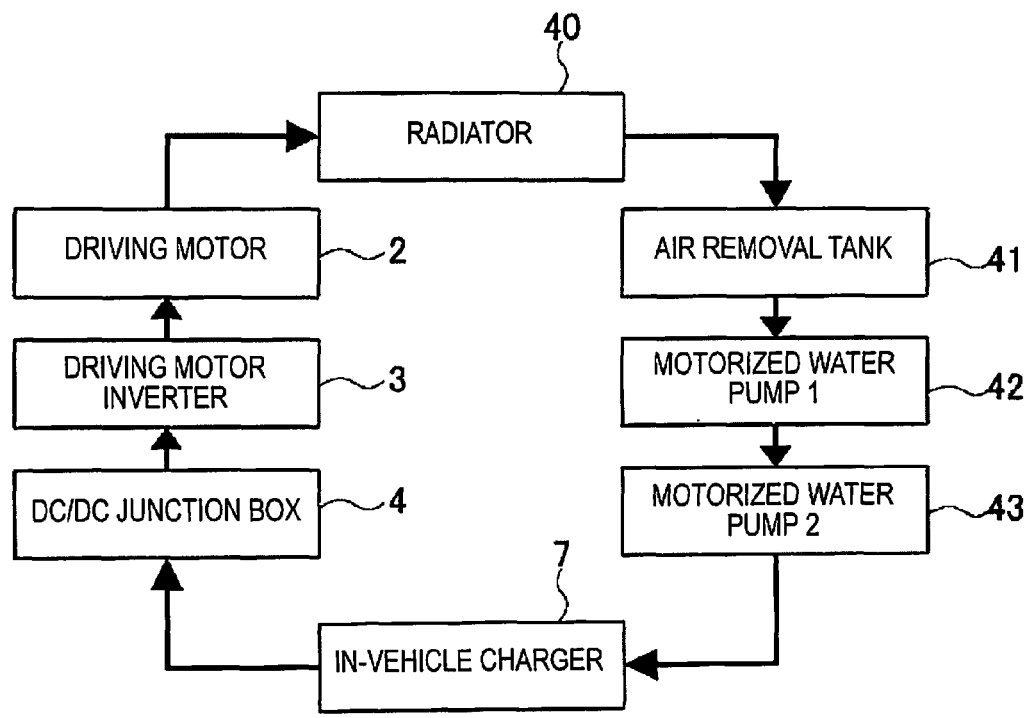
FIG. 7 is a high-voltage part cooling effect descriptive diagram showing how high-voltage parts are cooled in a high-voltage part cooling system.

When the first motorized water pump 42 and the second motorized water pump 43 are activated, a coolant circulation path along which the following components are disposed is formed as shown in FIG. 7: the first motorized water pump 42→the second motorized water pump 43→the in-vehicle charger 7→the DC/DC junction box 4→the driving motor inverter 3→the driving motor 2→the radiator 40→the air removal tank 41.

The coolant pumped by the first motorized water pump 42 and the second motorized water pump 43 therefore takes heat from the in-vehicle charger 7, the DC/DC junction box 4, the driving motor inverter 3, and the driving motor 2 so that these high-voltage parts are controlled to not reach a predetermined high temperature.

The coolant having taken heat from a plurality of high-voltage parts and having therefore been heated to a high temperature enters the radiator 40, is cooled based on coolant-outside air heat exchange, and is pumped again by the first motorized water pump 42 and the second motorized water pump 43 toward the plurality of high-voltage parts.

When the coolant is circulated, the radiator 40 and the first motorized water pump 42 vibrate at a vibration frequency in the low frequency band due to variation in pressure of the coolant that passes through the paths inside the radiator 40 and the first motorized water pump 42.

Front-End Module Vibration Suppression Effect

As described above, the out-compartment heat exchanger 12, the radiator 40, and the first motorized water pump 42 vibrate at a vibration frequency in the low frequency band. On the other hand, the cooling fan unit 28, in which the fans are rotated at high speed by the motors, vibrates at a vibration frequency in the high frequency band. Therefore, to achieve high vibration suppression performance, it is necessary to effectively suppress vibration at frequencies in the different frequency bands in a skillful manner. A vibration suppression effect provided by the front-end module FEM that achieves high vibration suppression performance is described below with reference to FIG. 8.

A description is first made of a reason why the front-end module is required to have high vibration suppression performance in an electric automobile.

For example, in the case for a front-end module in an engine-powered automobile, required vibration suppression performance can be achieved only by employing a configuration in which the radiator and the condenser are fixed to a radiator core support and the radiator core support is elastically supported by the vehicle body. In the case for a front-end module in an electric automobile, however, since the sound from the driving motor that is the drive source for running is much lower than the sound from an engine, pulsation sound and vibration propagated via the vehicle body into the vehicle compartment is more noticeable than in an engine-powered automobile. Therefore, to ensure quietness in the vehicle compartment, the front-end module is required to have high vibration suppression performance.

To damp vibration based on a spring-mass system, which damps vibration by lowering the vibrating frequency of a vibrating object to a sufficiently lower frequency, it is assumed in the damping that a low-frequency vibration part (such as heat exchanger) and a high-frequency vibration part (such as fan) are both configured to have a low vibration frequency. The same holds true for the front-end module, and vibration is damped by sufficiently lowering the frequency of a spring-mass system of a vibrating part. Consider now a Comparative Example in which a part that vibrates at a low frequency and a part that vibrates at a high frequency are fixed to a single frame and the frame is elastically supported by the vehicle body.

In the Comparative Example, effective damping of vibration of the low-frequency vibration part and the high-frequency vibration part and the rigidity with which the parts are supported by the vehicle body cannot be achieved at the same time.

That is, a resonant frequency f of an in-vehicle part is expressed as follows:

$$f = 1/2\pi(\sqrt{k/m})$$

where k represents the spring constant that depends on rubber hardness and other factors of a mount member, and m represents the mass. The expression described above clearly shows that a low frequency may be achieved by a small (low) spring constant k. A small spring constant k, however, lowers the rigidity. Low support rigidity of the front-end module, which while allowing damping of vibration of the front-end module itself, undesirably causes a vibration problem resulting from another vibration system, such as vibration of the front-end module itself due, for example, to an input from a road surface.

Therefore, when a mount member via which a frame is elastically supported by the vehicle body is made of a soft rubber (having low spring constant), the rigidity with which the frame is supported by the vehicle body lowers. Conversely, when the mount member via which the frame is elastically supported by the vehicle body is made of a hard rubber (having a high spring constant), vibration of the low-frequency vibration part cannot be damped.

Figure 8:
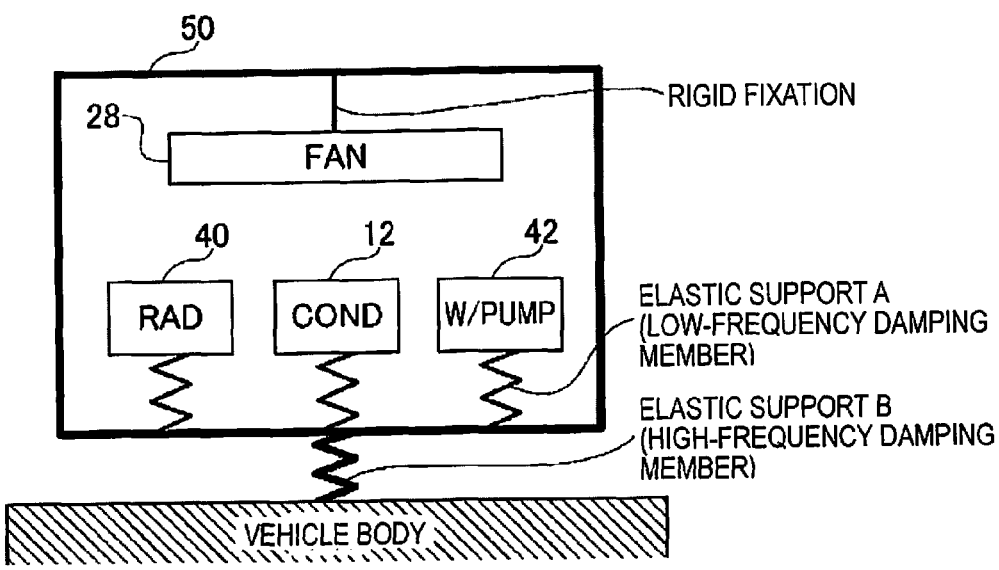
FIG. 8 is a vibration suppression effect descriptive diagram showing how the vibration suppression structure of the front-end module FEM according to Embodiment 1 suppresses vibration transmitted to a vehicle body.

In contrast, in Embodiment 1, the first in-vehicle parts 12, 40, and 42, which vibrate at frequencies in the first frequency band (low frequency band), are elastically supported by the vehicle body via the first mount member (elastic support A), the heat exchanger support frame 50, and the second mount member (elastic support B), which forms a double vibration suppression structure, as shown in FIG. 8. On the other hand, the second in-vehicle part 28, which vibrates at a frequency in the second frequency band (high frequency band) is rigidly fixed to the heat exchanger support frame 50 and elastically supported by the vehicle body via the heat exchanger support frame 50 and the second mount member (elastic support B), which forms a vibration suppression structure.

Therefore, when the first in-vehicle parts 12, 40, and 42 vibrate as parts at frequencies in the first frequency band (low frequency band), the vibration from the first in-vehicle parts 12, 40, and 42 is damped by the first mount member (elastic support A: low-frequency damping) and further damped by the second mount member (elastic support B: high-frequency damping member) before transmitted to the vehicle body, whereby pulsation sound and vibration propagated from the vehicle body into the vehicle compartment R can be suppressed to a small amount.

On the other hand, when the second in-vehicle part 28 vibrates as a part at a frequency in the second frequency band (high frequency band), the vibration from the second in-vehicle part 28 is damped by the second mount member (elastic support B: high-frequency damping member) along with the heat exchanger support frame 50 before transmitted to the vehicle body, whereby pulsation sound and vibration propagated from the vehicle body into the vehicle compartment can be suppressed to a small amount. In this configuration, the second mount member, via which the heat exchanger support frame 50 is supported by the vehicle body, does not need to damp vibration at a frequency in the first frequency band (low frequency band) and can therefore be formed of a hard member having a high spring constant, whereby the rigidity with which the heat exchanger support frame is supported by the vehicle body is not lowered.

As described above, the vibration suppression structure that damps vibration of parts at frequencies in the first frequency band (low frequency band) and the vibration suppression structure that damps vibration of parts at frequencies in the second frequency band (high frequency band) are configured to differ from each other. As a result, pulsation sound/vibration propagated from the plurality of in-vehicle parts 12, 40, 42, and 28 incorporated in the vehicle front section via the vehicle body into the vehicle compartment R can be suppressed without a decrease in the rigidity with which the in-vehicle parts are supported by the vehicle body.

Embodiment 1 employs the configuration in which the first mount member is a low-frequency damping member having a spring constant tuned to be low so that vibration of parts at frequencies in the first frequency band (low frequency band) is damped and the second member is a high-frequency damping member having a spring constant tuned to be high so that vibration of parts at frequencies in the second frequency band (high frequency band) is damped.

That is, vibration of the low-frequency vibration parts (such as out-compartment heat exchanger 12) can be damped, that is, attenuated by a low-spring-constant spring that forms the first mount member. In addition, since a high-spring-constant spring that forms the second mount member is used to achieve dual vibration suppression, high-frequency vibration components contained in the low-frequency vibration of the out-compartment heat exchanger 12 and other components can also be attenuated. On the other hand, the high-frequency vibration part (cooling fan unit 28) is rigidly fixed to the heat exchanger support frame 50 so that the amount of mass of the spring-mass system (mass of entire frame including heat exchanger and other parts) increases, and the rigidity high enough to support the entire frame assembled as a module is maintained, whereby vibration of the high-frequency vibration part can be damped, that is, attenuated by the spring having a spring constant higher than that of the low-frequency spring. As a result, vibration from the high/low frequency vibration parts can be damped.

Therefore, pulsation sound/vibration propagated from the first in-vehicle parts 12, 40, and 42 and the second in-vehicle part 28, which are incorporated in the vehicle front section, via the vehicle body into the vehicle compartment R can be suppressed, and the rigidity with which the in-vehicle parts are supported by the vehicle body can be ensured at the same time. In addition, high-frequency vibration components contained in the low-frequency vibration from the first in-vehicle parts 12, 40, and 42 can also be attenuated.

In Embodiment 1, the first in-vehicle parts include the radiator 40, which air-cools the coolant that cools the high-voltage parts 2, 3, 4, and 7, the out-compartment heat exchanger 12 in the in-vehicle air conditioning system, and the first motorized water pump 42, which pumps the coolant from the radiator 40 to the high-voltage parts 2, 3, 4, and 7. The second in-vehicle parts include the cooling fan unit 28, which is rigidly fixed to the heat exchanger support frame 50.

Therefore, in the electric automobile in which the high-voltage parts 2, 3, 4, and 7 are incorporated, pulsation sound/vibration propagated from the plurality of in-vehicle parts 12, 40, 42, and 28 incorporated in the vehicle front section via the vehicle body into the vehicle compartment R can be suppressed.

In Embodiment 1, the radiator 40 and the out-compartment heat exchanger 12 are disposed in the space surrounded by the heat exchanger support frame 50 in such a way that the heat exchanging surfaces of the radiator 40 and the out-compartment heat exchanger 12 are arranged side by side in the vehicle frontward/rearward direction. The heat exchanger support frame 50 is configured to have a multi-use frame structure that allows the positions of the radiator 40 and the out-compartment heat exchanger 12 in the vehicle frontward/rearward direction to be changed to each other.

Since a vehicle in which a cooling-dedicated air conditioning system is incorporated and a vehicle in which a heat-pump-type air conditioning system is incorporated differ from each other in terms of the positions of the two heat exchangers in the vehicle frontward/rearward direction, two heat exchanger support frames need to be prepared in accordance with the arrangement of the two heat exchangers.

In contrast, the multi-use frame structure of the heat exchanger support frame 50 allows the same heat exchanger support frame 50 to be used in a vehicle in which a cooling-dedicated air conditioning system is incorporated and a vehicle in which a heat-pump-type air conditioning system is incorporated.

Advantageous effects are next described.

The vibration suppression structure of the front-end module FEM according to Embodiment 1 can provide advantageous effects listed below:

(1) In the front-end module FEM, in which the plurality of in-vehicle parts 12, 40, 42, and 28 incorporated in the vehicle front section are aggregated and assembled to the heat exchanger support frame 50, the plurality of in-vehicle parts 12, 40, 42, and 28 are classified into the first in-vehicle parts 12, 40, and 42, which vibrate at frequencies in the first frequency band, and the second in-vehicle part 28, which vibrates at a frequency in the second frequency band having a frequency range higher than that in the first frequency band, the first in-vehicle parts 12, 40, and 42 are elastically supported by the heat exchanger support frame 50 via the first mount members 51, 52, and 53, the second in-vehicle part 28 is rigidly fixed to the heat exchanger support frame 50, and the heat exchanger support frame 50 is elastically supported by the vehicle body (upper front cross member 55 and lower front cross member 56) via the second mount members 57 and 58 (FIG. 8).

As a result, pulsation sound/vibration propagated from the plurality of in-vehicle parts 12, 40, 42, and 28, which are incorporated in the vehicle front section, via the vehicle body into the vehicle compartment R can be suppressed with no decrease in the rigidity with which the in-vehicle parts are supported by the vehicle body.

(2) Each of the first mount members described above is a low-frequency damping member having a spring constant tuned to be low so that vibration of parts at frequencies in the first frequency band (low frequency band) is damped, and Each of the second members described above is a high-frequency damping member having a spring constant tuned to be high so that vibration of parts at frequencies in the second frequency band (high frequency band) is damped (FIG. 8).

As a result, in addition to the advantageous effect in (1), pulsation sound/vibration propagated from the first in-vehicle parts 12, 40, and 42 and the second in-vehicle part 28, which are incorporated in the vehicle front section, via the vehicle body into the vehicle compartment R can be suppressed, and the rigidity with which the in-vehicle parts are supported by the vehicle body can be ensured at the same time. In addition, high-frequency vibration components contained in the low-frequency vibration from the first in-vehicle parts 12, 40, and 42 can also be damped.

(3) A vehicle is the electric automobile 1, in which the high-voltage parts 2, 3, 4, and 7 are incorporated, the first in-vehicle parts described above include the radiator 40, which air-cools the coolant that cools the high-voltage parts 2, 3, 4, and 7, the out-compartment heat exchanger 12 in the in-vehicle air conditioning system (heat-pump-type air conditioning system), and the motorized water pump (first motorized water pump 42) that pumps the coolant from the radiator 40 to the high-voltage parts 2, 3, 4, and 7, and the second in-vehicle parts described above include the cooling fan unit 28, which is rigidly fixed to the heat exchanger support frame 50 (FIGS. 3 and 4).

As a result, in addition to the advantageous effect in (1) or (2), in the electric automobile in which the high-voltage parts 2, 3, 4, and 7 are incorporated, pulsation sound/vibration propagated from the plurality of in-vehicle parts 12, 40, 42, and 28, which are incorporated in the vehicle front section, via the vehicle body into the vehicle compartment R can be suppressed.

(4) The radiator 40 and the out-compartment heat exchanger 12 are disposed in the space surrounded by the heat exchanger support frame 50 in such a way that the heat exchanging surfaces of the radiator 40 and the out-compartment heat exchanger 12 are arranged side by side in the vehicle frontward/rearward direction, and the heat exchanger support frame 50 is configured to have a multi-use frame structure that allows the positions of the radiator 40 and the out-compartment heat exchanger 12 in the vehicle frontward/rearward direction to be changed to each other (FIG. 4).

As a result, in addition to the advantageous effect in (3), the same heat exchanger support frame 50 can be used in vehicles in which two heat exchangers are disposed differently in the vehicle frontward/rearward direction, such as a vehicle in which a cooling-dedicated air conditioning system is incorporated and a vehicle in which a heat-pump-type air conditioning system is incorporated.

A vibration suppression structure for a front-end module according to the present invention has been described based on Embodiment 1, but the specific configurations are not limited to those in Embodiment 1. Changes, additions, and other modifications in design are allowed to the extent that they do not depart from the substance of the present invention set forth in the claims.

In Embodiment 1, the plurality of in-vehicle parts in the front-end module FEM are the radiator 40, the out-compartment heat exchanger 12, the first motorized water pump 42, and the cooling fan unit 28 by way of example. The plurality of in-vehicle parts in the front-end module are not limited to the in-vehicle parts described above. For example, an air-cooling intercooler, an air-cooling oil cooler, a head lamp, a charging port, and other in-vehicle parts may be added, and the in-vehicle parts described in Embodiment 1 may be replaced with other in-vehicle parts.

In Embodiment 1, the vibration suppression structure of the front-end module according to the present invention is used in an electric automobile by way of example. The vibration suppression structure of the front-end module according to the present invention can, of course, instead be used in a hybrid automobile and an engine-powered automobile as well as an electric automobile.

The invention claimed is:

1. A vibration suppression structure for a front-end module, the vibration suppression structure comprising:
    a heat exchanger support frame; and
    a plurality of in-vehicle parts disposed in a vehicle front section and being aggregated and assembled to the heat exchanger support frame,
    the plurality of in-vehicle parts including a first in-vehicle part configured to vibrate at a frequency in a first frequency band and a second in-vehicle part configured to vibrate at a frequency in a second frequency band, the second frequency band having a frequency range higher than a frequency range in the first frequency band,
    the first in-vehicle part being elastically connected to the heat exchanger support frame by a first mount member,
    the second in-vehicle part being rigidly fixed to the heat exchanger support frame, and
    the heat exchanger support frame being elastically connected to a vehicle body by a second mount member.

2. The vibration suppression structure according to claim 1, wherein
    the first mount member is a low-frequency damping member having a first spring constant tuned to a first predetermined amount so that vibration of a part at a frequency in the first frequency band is damped, and
    the second mount member is a high-frequency damping member having a second spring constant tuned to a second predetermined amount so that vibration of a part at a frequency in the second frequency band is damped, the frequency in the second frequency band being higher than the frequency in the first frequency band.

3. The vibration suppression structure according to claim 1, wherein
    the vibration suppression structure is configured for an electric automobile in which high-voltage parts are incorporated,
    the first in-vehicle part includes a radiator configured to air-cool a coolant that cools the high-voltage parts, an out-compartment heat exchanger in an in-vehicle air conditioning system, and a motorized water pump configured to pump the coolant from the radiator to the high-voltage parts, and
    the second in-vehicle part includes a cooling fan unit that is rigidly fixed to the heat exchanger support frame.

4. The vibration suppression structure according to claim 2, wherein
    the vibration suppression structure is configured for an electric automobile in which high-voltage parts are incorporated,
    the first in-vehicle part includes a radiator configured to air-cool a coolant that cools the high-voltage parts, an out-compartment heat exchanger in an in-vehicle air conditioning system, and a motorized water pump configured to pump the coolant from the radiator to the high-voltage parts, and
    the second in-vehicle part includes a cooling fan unit that is rigidly fixed to the heat exchanger support frame.

* * * * *